(12) United States Patent
Zhou et al.

(10) Patent No.: US 11,700,616 B2
(45) Date of Patent: Jul. 11, 2023

(54) DEFAULT APERIODIC CHANNEL STATE INFORMATION REFERENCE SIGNAL BEAM FOR SAME NUMEROLOGY TRIGGERING

(71) Applicant: QUALCOMM Incorporated, San Diego, CA (US)

(72) Inventors: Yan Zhou, San Diego, CA (US); Tao Luo, San Diego, CA (US); Huilin Xu, Temecula, CA (US); Alexandros Manolakos, Escondido, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 17/214,729

(22) Filed: Mar. 26, 2021

(65) Prior Publication Data
US 2021/0321372 A1    Oct. 14, 2021

Related U.S. Application Data

(60) Provisional application No. 63/008,647, filed on Apr. 10, 2020.

(51) Int. Cl.
*H04W 72/04* (2023.01)
*H04W 72/23* (2023.01)
(Continued)

(52) U.S. Cl.
CPC .......... *H04W 72/23* (2023.01); *H04L 5/0096* (2013.01); *H04W 72/044* (2013.01); *H04W 72/1268* (2013.01)

(58) Field of Classification Search
CPC ............... H04W 72/23; H04W 72/044; H04W 72/1268; H04L 5/0096; H04L 5/0053;
(Continued)

(56) References Cited

U.S. PATENT DOCUMENTS

2015/0131568 A1* 5/2015 You .................... H04L 5/0057
370/329
2019/0319833 A1 10/2019 Nagaraja et al.
(Continued)

OTHER PUBLICATIONS

CATT, et al., "Correction on Timing for MAC CE Applicability with HARQ-ACK Repetition in 38.214," 3GPP Draft, 3GPP TSG-RAN WG1 Meeting #98bis, R1-1911439, 3rd Generation Partnership Project (3GPP), Mobile Competence Centre, vol. RAN WG1, No. Chongqing, China, Oct. 14, 2019-Oct. 20, 2019, Oct. 22, 2019 (Oct. 22, 2019), XP051798705, 12 pages, Retrieved from the Internet: URL: https://ftp.3gpp.org/tsg_ran/WG1_RL1/TSGR1_98b/Docs/R1-1911439.zip R1-1911439.docx [retrieved on Oct. 22, 2019] section 5.2.1.5.1.

(Continued)

*Primary Examiner* — Kiet Tang
(74) *Attorney, Agent, or Firm* — Danai Nelisile Mhembere; Procopio, Cory, Hargreaves & Savitch LLP

(57) ABSTRACT

A UE receives DCI in a PDCCH, the DCI triggers reception of AP CSI-RS, and the PDCCH has a first numerology and the AP CSI-RS has a second numerology. The UE determines, when a CORESET is configured on an active BWP of a serving cell for receiving the AP CSI-RS and when the first numerology is the same as the second numerology, a default AP CSI-RS beam for receiving the AP CSI-RS based on a beam used for receiving the CORESET with a lowest ID in a latest monitored slot of the active BWP of the serving cell. The UE determines, otherwise when the first numerology is the same as the second numerology, the default AP CSI-RS beam for receiving the AP CSI-RS based on a QCL assumption of a PDSCH TCI state with a lowest ID on the active BWP of the serving cell for receiving the AP CSI-RS.

30 Claims, 10 Drawing Sheets

(51) Int. Cl.
*H04L 5/00* (2006.01)
*H04W 72/044* (2023.01)
*H04W 72/1268* (2023.01)

(58) Field of Classification Search
CPC ... H04L 5/0087; H04L 5/0091; H04L 5/0051; H04L 5/001; H04L 5/0023; H04B 7/0695
See application file for complete search history.

(56) References Cited

U.S. PATENT DOCUMENTS

2020/0374730 A1\* 11/2020 Gao .................. H04L 1/0026
2021/0091900 A1\* 3/2021 Zhang ................ H04W 56/001

OTHER PUBLICATIONS

International Search Report and Written Opinion—PCT/US2021/024702—ISA/EPO—dated Sep. 8, 2021.
Qualcomm Incorporated: "Remaining Issue on Multi-Beam Operation," 3GPP Draft, 3GPP TSG RAN WG1 Meeting #103-e, R1-2008611, 3rd Generation Partnership Project (3GPP), Mobile Competence Centre, vol. RAN WG1, No. e-meeting, Oct. 26, 2020-Nov. 13, 2020, Oct. 17, 2020 (Oct. 17, 2020), XP051940237, 5 pages, Retrieved from the Internet: URL: https://ftp.3gpp.org/tsg_ran/WG1_RL1/TSGR1_103-e/Docs/R1-2008611.zip R1-2008611 Remaining Issue on Multi-beam Operation. docx [retrieved on Oct. 17, 2020] section 4.

\* cited by examiner

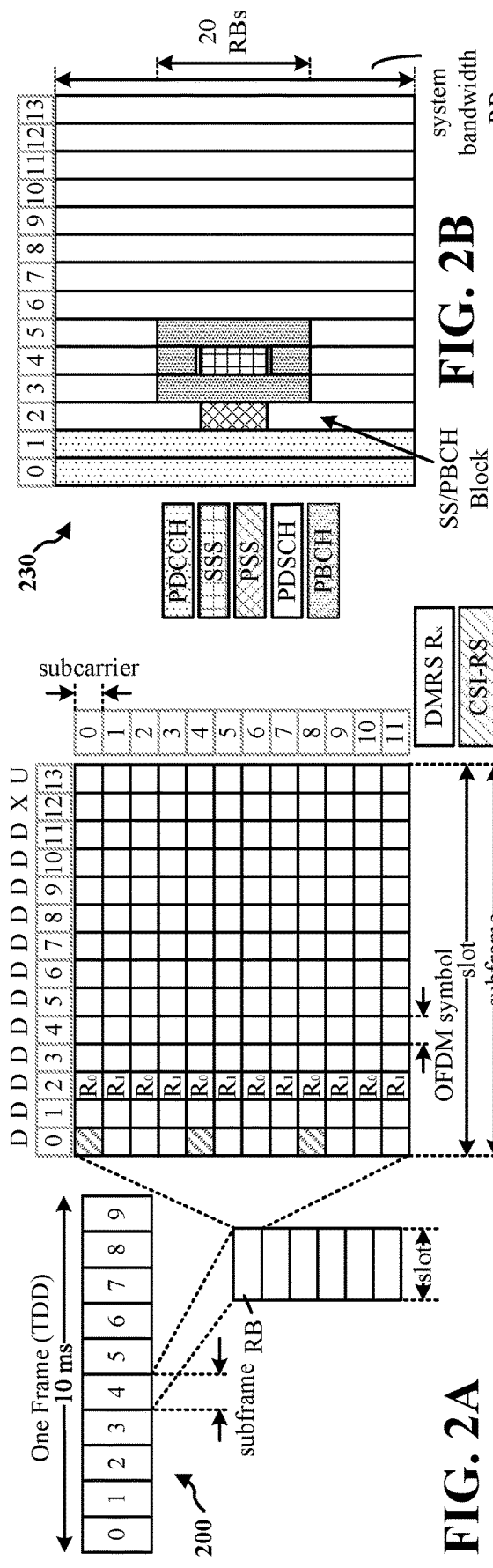
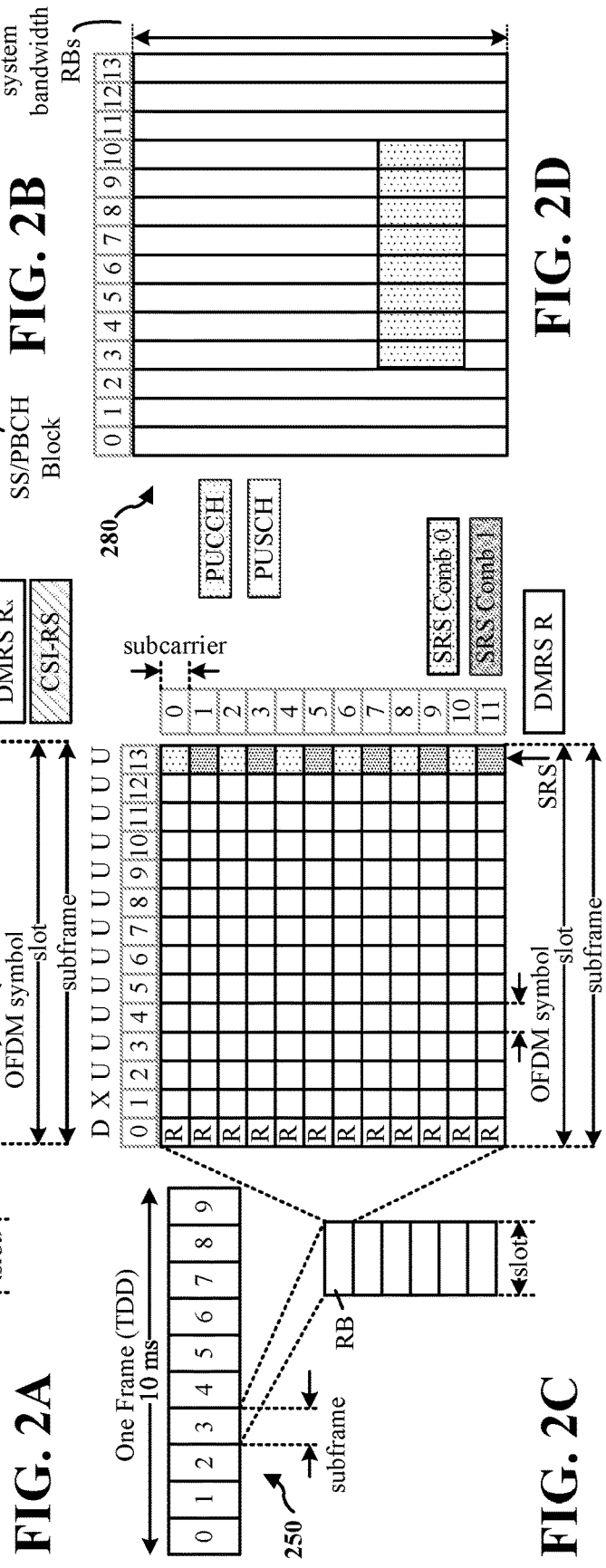
FIG. 2A  FIG. 2B  FIG. 2C  FIG. 2D

DEFAULT APERIODIC CHANNEL STATE INFORMATION REFERENCE SIGNAL BEAM FOR SAME NUMEROLOGY TRIGGERING

CROSS REFERENCE TO RELATED APPLICATION(S)

This application claims the benefit of U.S. Provisional Application Ser. No. 63/008,647, entitled "DEFAULT APERIODIC CHANNEL STATE INFORMATION REFERENCE SIGNALS BEAM FOR SAME NUMEROLOGY TRIGGERING" and filed on Apr. 10, 2020, which is expressly incorporated by reference herein in its entirety.

INTRODUCTION

The present disclosure relates generally to communication systems, and more particularly, to wireless communication involving aperiodic channel state information (CSI) reference signal (RS) (CSI-RS) beam.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a UE. The apparatus receives downlink control information (DCI) in a physical downlink control channel (PDCCH), the DCI triggering reception of aperiodic (AP) CSI-RS and reporting of CSI, the PDCCH having a first numerology and the AP CSI-RS having a second numerology. The apparatus determines, when a control resource set (CORESET) is configured on an active bandwidth part (BWP) of a serving cell for receiving the AP CSI-RS and when the first numerology is the same as the second numerology, a default AP CSI-RS beam for receiving the AP CSI-RS based on a beam used for receiving the CORESET with a lowest identifier (ID) in a latest monitored slot of the active BWP of the serving cell. The apparatus determines, otherwise when the first numerology is the same as the second numerology, the default AP CSI-RS beam for receiving the AP CSI-RS based on a quasi-co-located (QCL) assumption of a physical downlink shared channel (PDSCH) transmission control indicator (TCI) state with a lowest ID on the active BWP of the serving cell for receiving the AP CSI-RS.

In an aspect of the disclosure, a method, a computer-readable medium, and an apparatus are provided for wireless communication at a base station. The apparatus transmits, to a UE, DCI in a PDCCH, the DCI triggering reception of AP CSI-RS and reporting of CSI, the PDCCH has a first numerology and the AP CSI-RS has a second numerology. The apparatus transmits, to the UE, the AP CSI-RS, the first numerology being the same as the second numerology, where a scheduling offset between a last symbol of the PDCCH carrying the triggering DCI and a first symbol of the AP CSI-RS is smaller than a beam-switch-timing threshold reported by the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
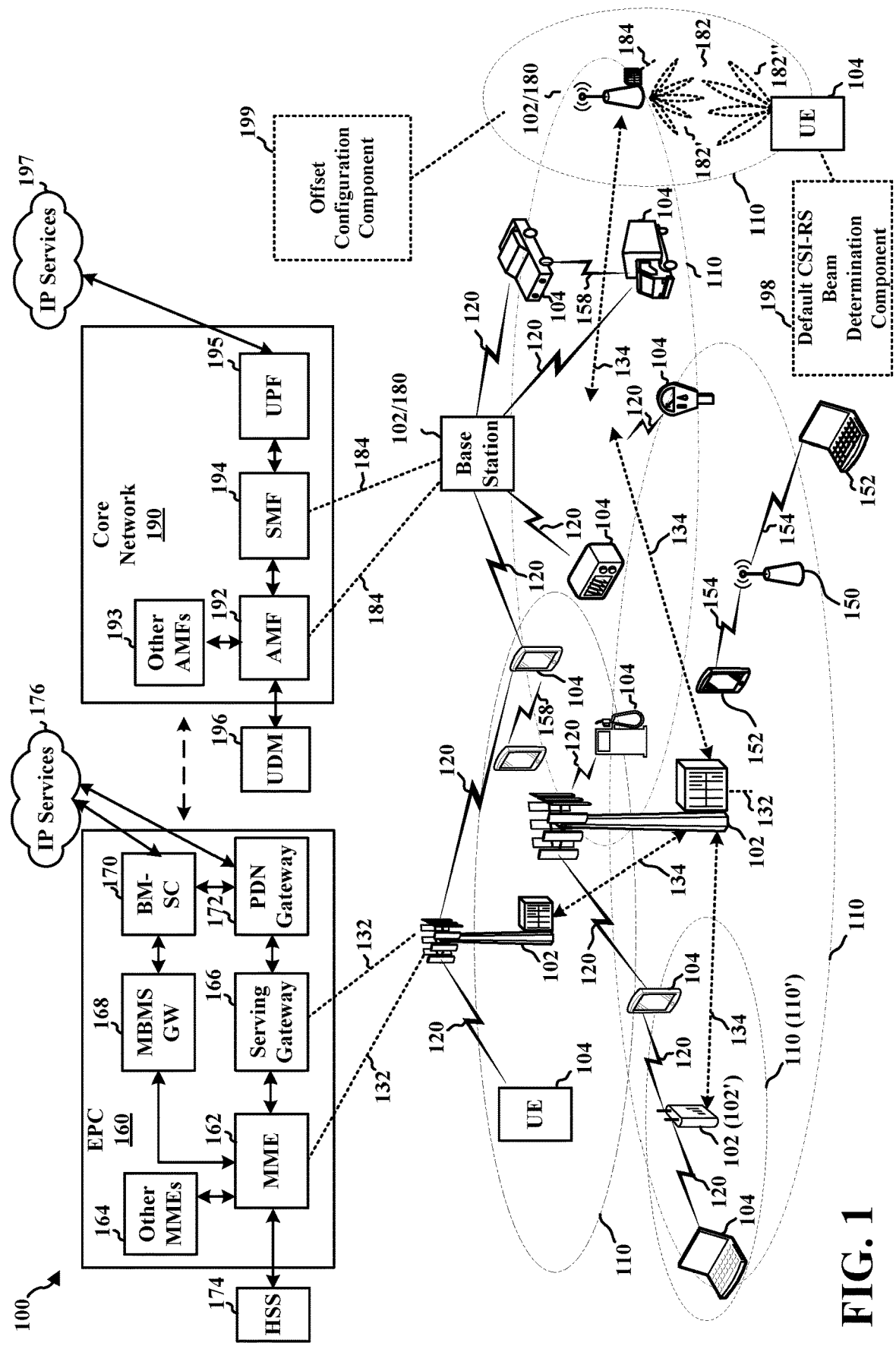
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5GNR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a default CSI-RS beam determination component 198 configured to determine a default beam for receiving AP CSI-RS if a triggering PDCCH and the associated AP CSI-RS have the same numerology (or same numerology triggering). In one configuration, the default CSI-RS beam determination component 198 may be configured to receive DCI in a PDCCH, the DCI triggering reception of AP CSI-RS and reporting of CSI, the PDCCH having a first numerology (corresponding to a first value of the parameter p, which indicates the subcarrier spacing of the first numerology) and the AP CSI-RS having a second numerology (corresponding to a second value of the parameter p, which indicates the subcarrier spacing of the second numerology). In such configuration, the default CSI-RS beam determination component 198 may determine, when a CORESET is configured on an active BWP of a serving cell for receiving the AP CSI-RS and when the first numerology is the same as the second numerology, a default AP CSI-RS beam for receiving the AP CSI-RS based on a beam used for receiving the CORESET with a lowest ID in a latest monitored slot of the active BWP of the serving cell. In such configuration, the default CSI-RS beam determination component 198 may determine, otherwise when the first numerology is the same as the second numerology, the default AP CSI-RS beam for receiving the AP CSI-RS based on a QCL assumption of a PDSCH TCI state with a lowest ID on the active BWP of the serving cell for receiving the AP CSI-RS.

In certain aspects, the base station 102/180 may include an offset configuration component 199 configured to transmit DCI and AP CSI-RS triggered by the DCI to a UE with a scheduling offset between the DCI and the AP CSI-RS being less than a beam switch latency threshold reported by the UE, where the PDCCH carrying the DCI may have the same numerology as the AP CSI-RS. In one configuration, the offset configuration component 199 may be configured to transmit, to a UE, DCI in a PDCCH, the DCI triggering reception of AP CSI-RS and reporting of CSI, the PDCCH has a first numerology and the AP CSI-RS has a second numerology. In such configuration, the offset configuration component 199 may transmit, to the UE, the AP CSI-RS, the first numerology being the same as the second numerology, where a scheduling offset between a last symbol of the PDCCH carrying the triggering DCI and a first symbol of the AP CSI-RS is smaller than a beam-switch-timing threshold reported by the UE.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2 slots/subframe. The subcarrier spacing and symbol length/duration are a function of the numerology. The subcarrier spacing may be equal to 2^y*15 kHz, where y is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
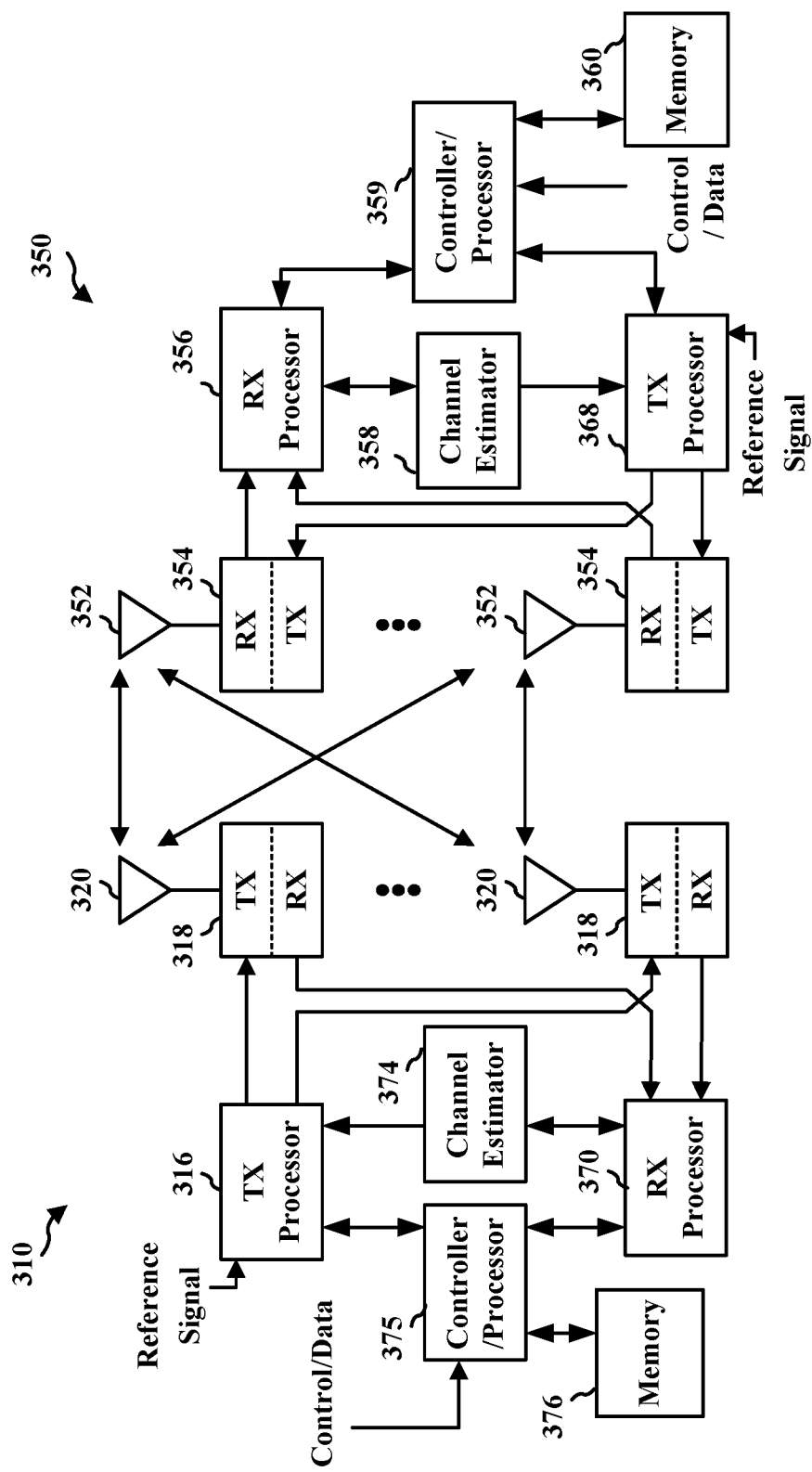
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the default CSI-RS beam determination component 198 of FIG. 1.

At least one of the TX processor 316, the RX processor 370, and the controller/processor 375 may be configured to perform aspects in connection with the offset configuration component 199 of FIG. 1.

A communication network may support the use of bandwidth parts (BWPs), where a BWP may be a contiguous set of physical resource blocks (PRBs) on a component carrier (CC). In other words, the BWP may be contiguous in frequency. Data and control channels may be received and/or transmitted within the BWP. The BWPs may provide the network with more flexibility in assigning resources in a CC as the BWPs may enable multiplexing of different signals and/or signal types for a more efficient use of the frequency spectrum and of UE power. A CC may be divided into multiple BWPs (e.g., one to four BWPs per CC) for uplink and/or downlink transmissions. For example, a UE may be configured with up to four downlink BWPs and up to four uplink BWPs for each serving cell. Although multiple BWPs may be defined in the downlink and the uplink, there may be one active BWP in the downlink and/or one active BWP in the uplink at a given time on an active serving cell. The active BWP may define the UE's operating bandwidth within the cell's operating bandwidth. The UE may not use BWPs that are configured for the UE but are not activated (e.g., deactivated or otherwise not in the active state) to transmit or receive data.

A BWP may further be configured with various parameters which may include numerology, frequency location, bandwidth size, and/or control resource set (CORESET). A CORESET may define frequency domain resource blocks (RBs) and time domain durations (i.e., number of consecutive symbols) of the control region of PDCCH. For example, a CORESET may correspond to a set of physical resources in time and frequency that a UE uses to monitor for a PDCCH/DCI, where each CORESET may include one or more RBs in the frequency domain and one or more symbols in the time domain. As an example, a CORESET may include multiple RBs in the frequency domain and one (1), two (2), or three (3) contiguous symbols in the time domain. A resource element (RE) is a unit indicating one subcarrier in frequency over a single symbol in time. A control channel element (CCE) may include resource element groups (REGs), e.g., 6 REGs, in which an REG may correspond to one RB (e.g., 12 REs) during one OFDM symbol. REGs within a CORESET may be numbered in an increasing order in a time-first manner, starting with zero (0) for the first OFDM symbol and the lowest-numbered RB in the CORESET. A UE may be configured with multiple CORESETs (e.g., up to three or five) in a BWP of a serving cell, each CORESET being associated with a CCE-to-REG mapping. Each CORESET may be assigned with a CORESET identifier (ID). As each UE may use up to four BWPs in a transmission, a UE may be configured with up to 12 CORESETs on a serving cell, where each CORESET may be assigned with an index of 0-11 (e.g., CORESET #0, CORESET #1, CORESET #2, etc.). A CORESET with ID=0 (e.g., CORESET #0) may be configured by a master information block (MIB).

For receiving a PDCCH, the UE may perform blind decoding on the PDCCH as the UE may be configured with multiple PDCCH candidates to monitor. As multiple PDCCHs may be transmitted by a base station in a given time (e.g., in a single subframe) and one or more PDCCHs within the transmission may not be dedicated to the UE (e.g., they may be dedicated to other UEs), the UE may identify or locate the PDCCH dedicated to the UE within the transmission by monitoring a set of PDCCH candidates (e.g., a set of consecutive CCEs on which a PDCCH could be mapped) in a configured duration (e.g., every subframe). The UE may try to blind decode each PDCCH candidate using its radio network temporary identifier (RNTI). If a PDCCH candidate's cyclic redundancy check (CRC) is demasked by the UE's RNTI without a CRC error, the UE may determine that the PDCCH candidate carries the UE's control information (e.g., is dedicated to the UE).

When a UE performs blind decoding for a set of PDCCH candidates, the set of PDCCH candidates to be monitored by the UE may be configured for the UE by search space (SS) sets. Thus, an SS set associated with a CORESET may be used to define the slot pattern and starting symbol of the control region in each slot of the pattern. A UE may determine the slot for monitoring the SS set based on the periodicity, the offset, and/or the duration associated with the SS set. There may be one or more types of SS sets, such as a common SS (CSS) set that is generally monitored by a group of UEs in a cell, and there may be a UE-specific SS set that is monitored by a specific UE, etc. For example, a Type0-PDCCH CSS set may be used for PDCCH scheduling a system information block 1 (SIB1), a Type0A-PDCCH CSS set may be used for PDCCH scheduling other system information (OSI), a Type1-PDCCH CSS set may be used for a PDCCH relating to random access, a Type2-PDCCH CSS set may be used for a PDCCH scheduling page message, a Type3-PDCCH CSS set may be used for all the other PDCCHs monitored in a CSS, a UE specific search space (USS) set may be used for PDCCH scheduling UE-specific data, etc.

Figure 4:
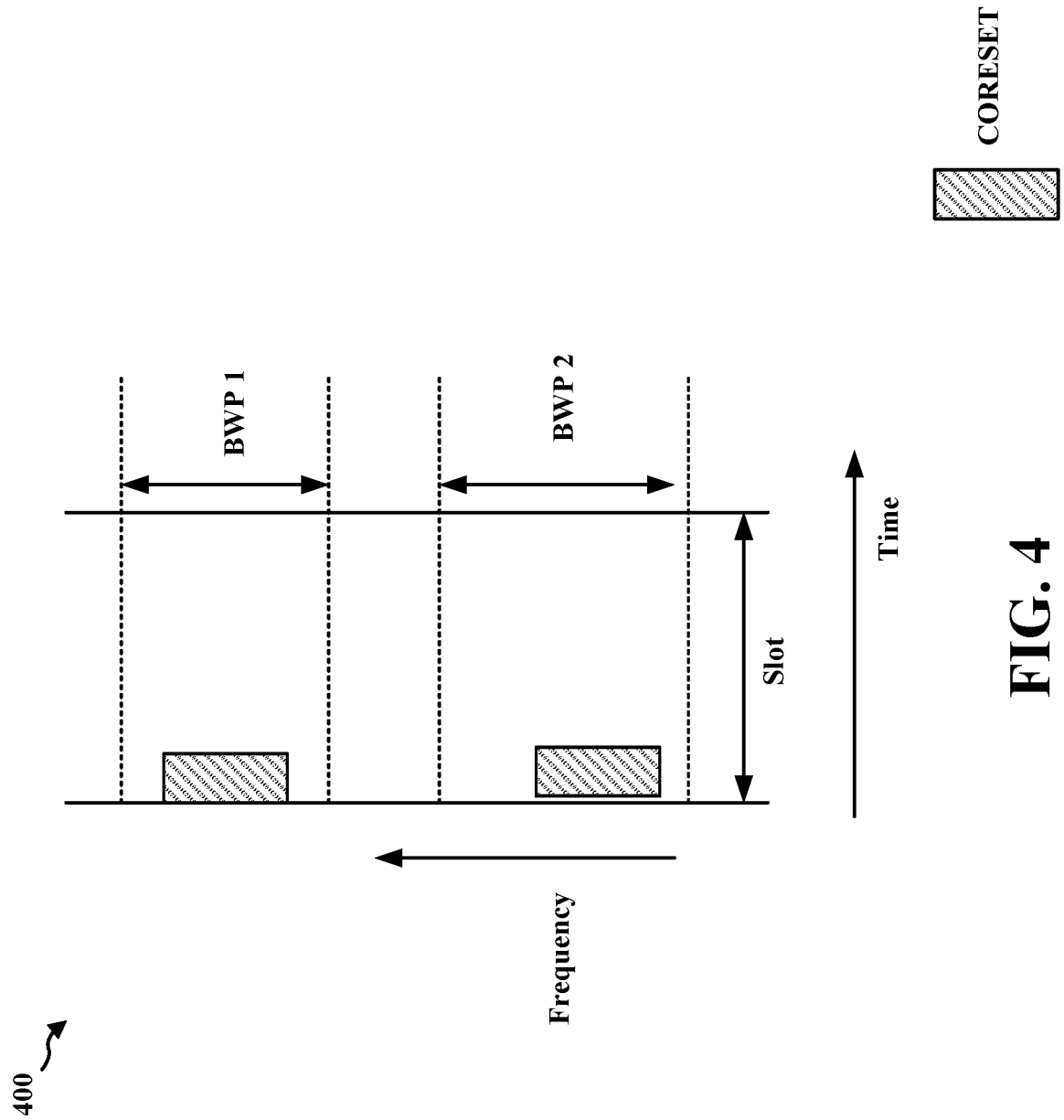
FIG. 4 is a diagram illustrating an example of time and frequency for multiple bandwidth parts (BWPs), and a control resource set (CORESET) for each BWP.

CORESETs may be defined at the cell level and the list of CORESETs to be monitored by a UE may be indicated in an active BWP. A base station may configure multiple CORESETs and multiple SS sets for a UE in an active BWP. For example, the base station may configure up to three CORESETs and 10 SS sets per BWP for the UE. As a UE may be configured for multiple BWPs (e.g., up to four BWPs), the UE may be configured with up to 40 SS sets and 12 CORESETs, where each SS set may be assigned with an index of 0-39 and each CORESET may be assigned with an index of 0-11. Each SS set may be associated with a CORESET. Each CORESET ID of the CORESETs configured for the UE may map to a particular BWP, and each SS set ID of the multiple SS sets configured for the UE may map to a particular BWP, for example. FIG. 4 illustrates an example time and frequency diagram 400 showing multiple BWPs, and a CORESET for each BWP. An SS may comprise a set of CCEs, e.g., at different aggregation levels. For example, the SS may indicate a number of candidates to be decoded, e.g., in which the UE performs decoding.

A base station may transmit at least one channel state information (CSI) reference signal (RS) (CSI-RS) to a UE, where the UE may measure the channel quality based on the received CSI-RS (e.g., the reference signal received power (RSRP) of the CSI-RS) and report the measured channel quality back to the base station, such as via CSI reporting. In some examples, the base station may transmit the CSI-RS at the start of an OFDM symbol in a slot, and the CSI-RS may occupy one (1), two (2), and/or four (4) OFDM symbols depending upon on the number of configured ports. A base station may configure the CSI-RS to be transmitted to a UE periodically, semi-persistently, and/or aperiodically. As such, the CSI reporting from the UE may be configured to be periodic, semi-persistent, or aperiodic (AP).

Figure 5:
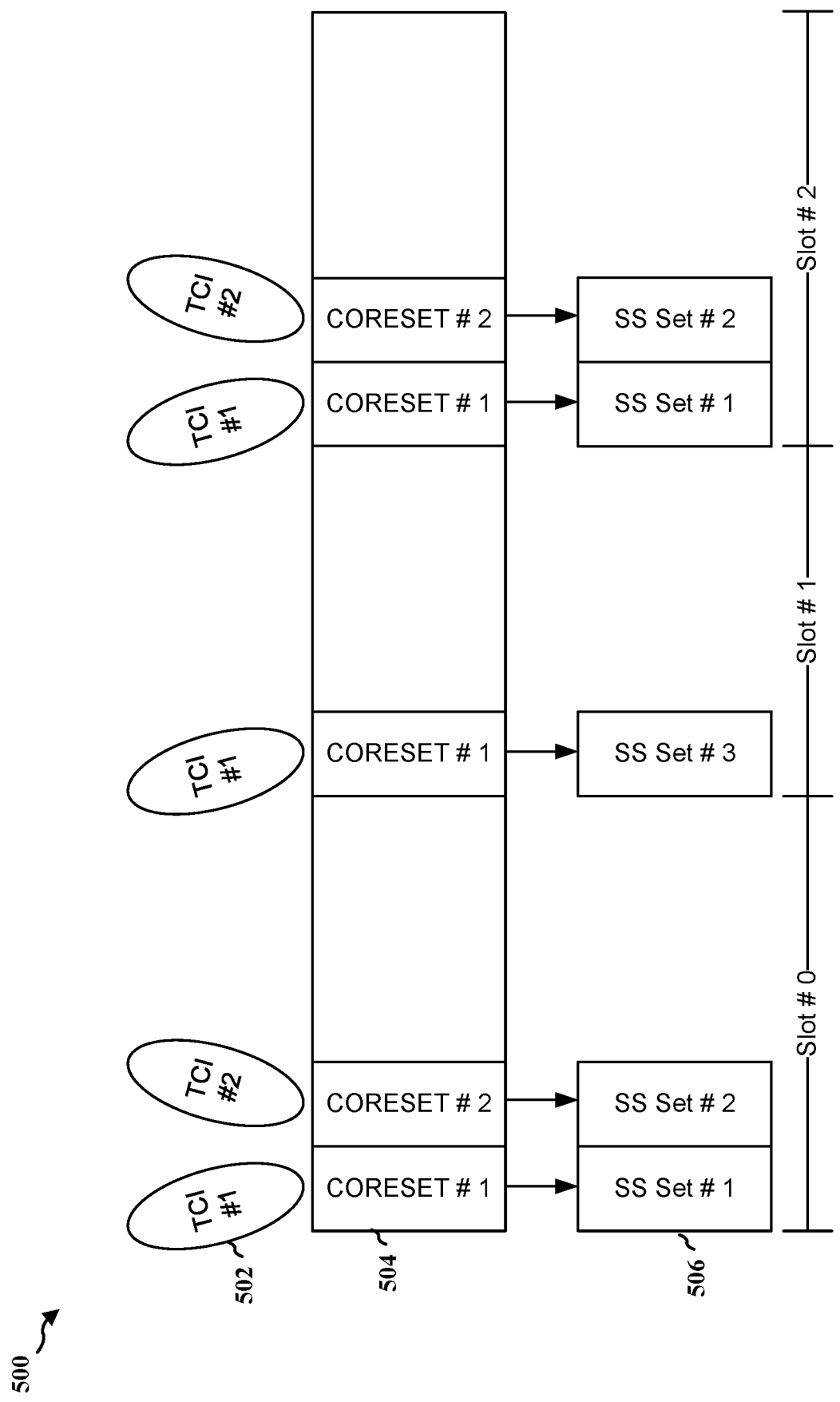
FIG. 5 is a diagram illustrating an example of a UE monitoring an SS set associated with a CORESET in a multi-beam operation for a PDCCH.

As mentioned previously, a network may use a directional beamformed transmission and reception based on a large number of antennas between the base station and the UE. FIG. 5 is a diagram 500 illustrating an example of a UE monitoring an SS set 506 associated with a CORESET 504 in a multi-beam operation for a PDCCH. To support multi-beam operation for the PDCCH, the network may provide a higher-layer configuration for beamforming per CORESET, e.g., through transmission configuration indication (TCI) 502 state configuration. For example, when a UE is monitoring an SS set associated with a CORESET (e.g., 504 and 506), the UE may receive the PDCCH in the CORESET based on the TCI 502 state configuration configured for the CORESET.

In some examples, information related to one or more beam(s) in which a UE may use for receiving a PDCCH may be implicitly known to the UE based on a quasi-co-location (QCL) relationship between downlink (DL) reference signals (DL RSs) (e.g., CSI-RS) and the demodulation reference signals (DM-RSs) of the PDCCH. The DL RS may include CSI-RS, where one or more CSI-RSs may be configured to be associated with one or more receiving beams of the UE. A base station may transmit TCI states to a UE in a downlink control information (DCI) message, which may include information and/or configuration related to QCL relationships between the DL RSs in one CSI-RS set and the PDSCH DMRS ports. For purposes of the present disclosure, two antenna ports may be considered to be QCLed if properties of the channel over which a symbol on one antenna port is conveyed may be inferred from the channel over which a symbol on the other antenna port is conveyed. As such, a UE may utilize the QCL relations of a pair of beams to infer information from one beam to another. For example, if a transmission reception point (TRP) transmits a first RS and a second RS to a UE using a same spatial filter, the first RS and the second RS may be QCLed and have similar channel conditions and properties. Thus, if the UE is able to detect and/or receive the first RS, the UE may also detect and/or receive the second RS based on similar configurations and/or settings.

A UE may indicate to a base station a beam latency threshold (e.g., a minimum number of OFDM symbols) between the DCI triggering of AP CSI-RS and AP CSI-RS transmission (e.g., via a beamSwitchTiming parameter), such that the UE may have a sufficient time to perform a beam switch between receiving the DCI and receiving the associated AP CSI-RS. The number of OFDM symbols for the beam latency threshold may be measured from the last symbol of the PDCCH carrying the triggering DCI to the first symbol of the AP CSI-RS. Based on the indicated beam latency threshold, the base station may provide a scheduling offset between the last symbol of the PDCCH carrying the triggering DCI and the first symbol of the AP CSI-RS resources that is greater than or equal to the beam latency threshold reported by the UE (e.g., the beamSwitchTiming reported by the UE).

In some examples, a base station may configure a scheduling offset for a UE in which the scheduling offset may be less than the beam latency threshold indicated by the UE (e.g., the scheduling offset<the beamSwitch Timing threshold). In such examples, the UE may not have a sufficient time to decode a received DCI. Without decoding the DCI, the UE may not know if one or more AP CSI-RSs are associated with the DCI on one or more symbols. In one example, the UE may use a default beam (e.g., based on a beam rule defined at the UE) to buffer a potential DL signal. Then, if the UE later decodes the DCI and discovers there are one or more AP CSI-RSs scheduled for the UE on one or more symbols, the UE may use the default beam that buffered the DL signal to load the corresponding stored data to process the AP CSI-RS, and the UE may generate a corresponding AP CSI-RS report.

In some examples, a UE may not know which default beam to use for buffering the potential DL signal (e.g., CSI-RS), such as if the UE is unaware whether one or more AP CSI-RSs are scheduled for the UE on one or more symbols. As such, the UE may be configured to apply a set of beam rules defined/configured for the UE for determining a default beam for receiving the DL signal (e.g., for receiving CSI-RS).

In one example, for AP CSI reporting and/or AP CSI-RS reception, the triggering PDCCH and the AP CSI-RS may have different numerologies (or different numerology triggering), e.g., the PDCCH may be associated with a first numerology and the AP CSI-RS may be associated with a second numerology, etc. In such an example, if the subcarrier spacing (SCS) for the PDCCH (e.g., pPDCCH) is smaller than the subcarrier spacing for CSI-RS (e.g., pCsIRs), and if the scheduling offset between the last symbol of the PDCCH carrying the triggering DCI and the first symbol of the triggered AP CSI-RS resources in a non-zero-power CSI-RS resource set (e.g., in a NZP-CSI-RS-ResourceSet) configured without a higher layer parameter (e.g., trs-Info) and without the higher layer parameter repetition is smaller than the UE reported threshold (e.g., the beamSwitchTiming)+d in PDCCH symbols, if there is any other DL signal with an indicated TCI state in the same symbols as the AP CSI-RS, the UE may apply the QCL assumption of the other DL signal also when receiving the AP CSI-RS. The UE may apply the QCL assumption of the other DL signal when the reported value is one of the values of {14, 28, 48} and where the beam switching timing delay d may be defined by the Table 1 below.

TABLE 1 beam switching timing delay d

| $\mu_{PDCCH}$ | d [PDCCH symbols] |
|---|---|
| 0 | 8 |
| 1 | 8 |
| 2 | 14 |

For example, the UE may process the AP CSI-RS by using the data buffered by the same beam or same TCI state. The other DL signal may refer to a PDSCH scheduled with an offset larger than or equal to a time duration for QCL threshold (e.g., the timeDurationForQCL threshold), an AP CSI-RS scheduled with an offset larger than or equal to the UE reported threshold (e.g., beamSwitchTiming)+d in PDCCH symbols when the reported value is one of the values {14, 28, 48}, periodic CSI-RS, and/or semi-persistent CSI-RS.

On the other hand, for AP CSI-RS where there is no scheduled DL signal, if at least one CORESET is configured for the BWP in which the AP CSI-RS is to be received, when receiving the AP CSI-RS, the UE may apply the QCL assumption used for the CORESET associated with a monitored SS with the lowest CORESET ID in the latest slot in which one or more CORESETs within the active BWP of the serving cell are monitored. In other words, the UE may use a receiving (Rx) beam used for receiving the CORESET associated with the monitored SS with the lowest CORESET ID in the latest slot in an active BWP to buffer the AP CSI-RS for later process. However, if the BWP in which the AP CSI-RS is to be received is not configured with at least one CORESET, when receiving the AP CSI-RS, the UE may apply the QCL assumption of the lowest-CORESET ID activated PDSCH TCI state applicable to the PDSCH within the active BWP of the cell in which the CSI-RS is to be received (e.g., corresponding to the receiving beam that buffered AP CSI-RS). In other words, if a scheduled offset is less than a beam switch latency threshold reported by a UE and if a BWP in which the AP CSI-RS is to be transmitted to the UE is not configured with at least one CORESET, the UE may select a default AP-CSI RS beam based on a QCL assumption of a PDSCH TCI state with a lowest ID on the active BWP of the serving cell for receiving the AP CSI-RS.

Aspects presented herein may enable a UE to determine a default beam for receiving AP CSI-RS if a triggering PDCCH and the associated AP CSI-RS have the same numerology (or same numerology triggering). For example, if at least one CORESET is configured on an active BWP of a scheduled CC for receiving AP CSI-RS, a UE may apply a default AP CSI-RS beam that follows the beam for receiving the CORESET with lowest ID in the latest monitored slot in that active BWP. If at least one CORESET is not configured on the active BWP, the UE may apply a default AP CSI-RS beam that follows the activated PDSCH TCI state with a lowest ID on the active BWP of the scheduled CC for receiving the AP CSI-RS.

In one aspect of the present disclosure, a scheduling offset between the last symbol of the PDCCH carrying the triggering DCI and the first symbol of the AP CSI-RS resources in a non-zero-power CSI-RS resource set (e.g., NZP-CSI-RS-ResourceSet) configured without a higher layer parameter (e.g., the trs-Info parameter) and without the higher layer parameter repetition may be smaller than the UE reported threshold (e.g., the indicated beamSwitch Timing threshold). If there is any other DL signal with an indicated TCI state in the same symbols as the CSI-RS, the UE may apply a QCL assumption of the other DL signal also when receiving the AP CSI-RS. For example, the UE may apply a QCL assumption of the other DL signal when the reported value is one of the values of {14, 28, 48}, or is smaller than 48 when the value of the UE reported threshold (e.g., the indicated beamSwitchTiming threshold) is one of the values of {224, 336}. The other DL signal may refer to a PDSCH scheduled with an offset greater than or equal to a time duration for QCL threshold (e.g., the timeDurationForQCL threshold which may indicate a minimum number of OFDM symbols for a UE to perform PDCCH reception and apply spatial QCL information received in DCI for PDSCH processing), AP CSI-RS scheduled with offset greater than or equal to the UE reported threshold (e.g., the indicated beamSwitchTiming threshold) when the reported threshold is one of the values {14, 28, 48}, AP CSI-RS scheduled with offset greater than or equal to 48 when the reported threshold is one of the values {224, 336}, periodic CSI-RS, and/or semi-persistent CSI-RS.

However, when there is no DL signal with an indicated TCI state in the same symbols as the CSI-RS, if the active BWP of the serving cell for receiving the AP CSI-RS has configured CORESET(s), when receiving the AP CSI-RS, the UE may apply the QCL assumption used for the CORESET(s) associated with a monitored SS with the lowest CORESET ID (e.g., the controlResourceSetId) in the latest slot in which one or more CORESETs within the active BWP of the serving cell are monitored. In other words, the UE may use a receiving (Rx) beam used for receiving the CORESET associated with the monitored SS with the lowest CORESET ID in the latest slot in an active BWP to buffer the AP CSI-RS for a later process. However, if the BWP in which the AP CSI-RS is to be received is not configured with CORESET(s), when receiving the AP CSI-RS, the UE may apply the QCL assumption of the lowest-CORESET ID activated PDSCH TCI state applicable to the PDSCH within the active BWP of the cell in which the CSI-RS is to be received (e.g., corresponding to the receiving beam that buffered AP CSI-RS). As such, if a scheduled offset is less than a beam switch latency threshold reported by a UE and if a BWP in which the AP CSI-RS is to be transmitted to the UE is not configured with at least one CORESET, the UE may select a default AP-CSI RS beam based on a QCL assumption of a PDSCH TCI state with a lowest ID on the active BWP of the serving cell for receiving the AP CSI-RS.

In other words, when the triggering PDCCH and the CSI-RS have the same numerology, for AP CSI reporting and/or aperiodic CSI-RS, if the scheduling offset between the last symbol of the PDCCH carrying the triggering DCI and the first symbol of the aperiodic CSI-RS resources in a NZP-CSI-RS-ResourceSet configured without a higher layer parameter trs-Info and without the higher layer parameter repetition is smaller than the UE reported threshold beamSwitchTiming, when the reported value is one of the values of {14, 28, 48}, or is smaller than 48 when the reported value of beamSwitch Timing is one of the values of {224, 336}; if there is any other DL signal with an indicated TCI state in the same symbols as the CSI-RS, the UE applies the QCL assumption of the other DL signal also when receiving the aperiodic CSI-RS. The other DL signal refers to PDSCH scheduled with an offset greater than or equal to the threshold timeDurationForQCL, aperiodic CSI-RS scheduled with an offset greater than or equal to the UE reported threshold beamSwitchTiming when the reported value is one of the values {14,28,48}, aperiodic CSI-RS scheduled with offset greater than or equal to 48 when the reported value of beamSwitchTiming is one of the values {224, 336}, periodic CSI-RS, semi-persistent CSI-RS; else if at least one CORESET is configured for the BWP in which the aperiodic CSI-RS is received, when receiving the aperiodic CSI-RS, the UE applies the QCL assumption used for the CORESET associated with a monitored search space with the lowest controlResourceSetId in the latest slot in which one or more CORESETs within the active BWP of the serving cell are monitored; else if the UE is configured with applying a default beam for component carriers (CCs) (e.g., the UE is configured with an enableDefaultBeamForCCS parameter) and when receiving the aperiodic CSI-RS, the UE applies the QCL assumption of the lowest-ID activated TCI state applicable to the PDSCH within the active BWP of the cell in which the CSI-RS is to be received.

In another aspect of the present disclosure, a UE may be configured to indicate, to a base station, a capability to support a scheduling offset between a scheduling DCI and AP CSI-RS to be less than a beam switch latency threshold (e.g., the beamSwitchTiming threshold) reported by the UE when the triggering PDCCH and the CSI-RS have different numerologies (e.g., different numerology triggering) and/or when the triggering PDCCH and the CSI-RS have the same numerology (e.g., same numerology triggering). In one example, the beam switch latency threshold may include at least two values, a first value (e.g., the beamSwitchTiming threshold) may be configured/defined for the same numerology triggering and a second value (e.g., the beamSwitch-Timing threshold+d in PDCCH symbols) for the different numerology triggering, such as described above. In another example, at least two separate capabilities may be configured for the UE, where the UE may use a first capability to indicate, to the base station, a capability to support a scheduling offset between a scheduling DCI and AP CSI-RS to be less than a beam switch latency threshold reported by the UE when the triggering PDCCH and the CSI-RS have different numerologies (e.g., different numerology triggering), and the UE may use a second capability to indicate, to the base station, a capability to support a scheduling offset between a scheduling DCI and AP CSI-RS to be less than a beam switch latency threshold reported by the UE when the triggering PDCCH and the CSI-RS have the same numerology (e.g., same numerology triggering).

For example, a UE may indicate to a base station (e.g., via a crossCarrierSchedulingDefaultQCL-r16 parameter) whether the UE may be configured with enable default beam for cross carrier scheduling (CCS) (e.g., whether the UE may be configured with enableDefaultBeamForCCS) for default QCL assumption for CCS for same numerology and/or for different numerologies. For example, a UE may indicate it supports default beam for CCS for default QCL assumption for CCS for the same numerology by transmitting a crossCarrierScheduling-SameSCS indication to the base station, and/or a UE may indicate it supports default beam for CCS for default QCL assumption for cross-carrier scheduling for different numerologies by transmitting a crossCarrierSchedulingDL-DiffSCS-r16 indication to the base station, etc. In some examples, a value diff-only may be used to indicate the UE supports this feature (e.g., enable default beam for CCS for default QCL assumption for cross-carrier scheduling) for different SCS combination(s). In some examples, a value both may be used to indicate the UE supports this feature for the same SCS and for different SCS combination(s), etc.

If the UE indicates to the base station the capability to support default beam for CCS for default QCL assumption for cross-carrier scheduling for same numerology and/or different numerologies, it may imply that the UE has the capability to support the corresponding default AP CSI-RS beam rules, e.g., the UE may support a scheduling offset that is less than the beam switch latency threshold reported by the UE for the same numerology triggering and/or the different numerology triggering. In response to the indicated capability, the base station may determine whether to schedule a scheduling offset that is less than the beam switch latency threshold reported by the UE for the same numerology triggering and/or for the different numerology triggering. In one example, the default AP CSI-RS beam rules may apply to a single TRP operation. In addition, aspects disclosed herein may be independent from other aspects discussed, and may be implemented on their own.

In another example, a UE may use a single capability to indicate, to a base station, a support for a scheduling offset between a scheduling DCI and AP CSI-RS to be less than a beam switch latency threshold reported by the UE when the triggering PDCCH and the CSI-RS have different numerologies and when the triggering PDCCH and the CSI-RS have the same numerology.

In another aspect of the present disclosure, a base station may indicate to a UE whether a scheduled offset may be less than a beam switch latency threshold reported by the UE and/or may be greater than or equal to the beam switch latency threshold reported by the UE. In one example, the base station may transmit/indicate to the UE whether a scheduled offset is to be less than, equal to, or greater than a beam switch latency threshold by using a flag. For example, if the flag is set by the base station, it may indicate that the offset between the scheduling DCI and the AP CSI-RS may be less than the beam switch latency threshold, and if the flag is not set by the base station, it may indicate that the offset may be greater than or equal to the beam switch latency threshold. In one example, the base station may be configured with two separate flags for same numerology triggering and different numerology triggering, e.g., one flag for the same numerology triggering and another flag for the different numerology triggering. In another example, the base station may be configured with a single flag for both the same numerology triggering and the different numerology triggering.

In another example, the base station may set the flag if the UE has indicated to the base station the capability to support a scheduled offset that is less than the beam switch latency threshold reported by the UE, and the base station may not set the flag if the UE has not indicated to the base station the capability to support a scheduled offset that is less than the beam switch latency threshold reported by the UE. In other words, the flag may be set if the UE indicates the above capability of supporting an offset less than the threshold. The base station may indicate the flag to the UE in at least one of downlink control information (DCI), a medium access control (MAC) control element (CE) (MAC-CE), and/or radio resource control (RRC) signaling. As such, if the flag is set, a UE may apply the corresponding default CSI-RS beam rule(s) for the different numerology triggering and the same numerology triggering to set a default AP CSI-RS beam when a base station schedules an offset that is less than the beam switch latency threshold reported by the UE. Aspects disclosed herein may be independent from other aspects discussed, and may be implemented on its own.

Figure 6:
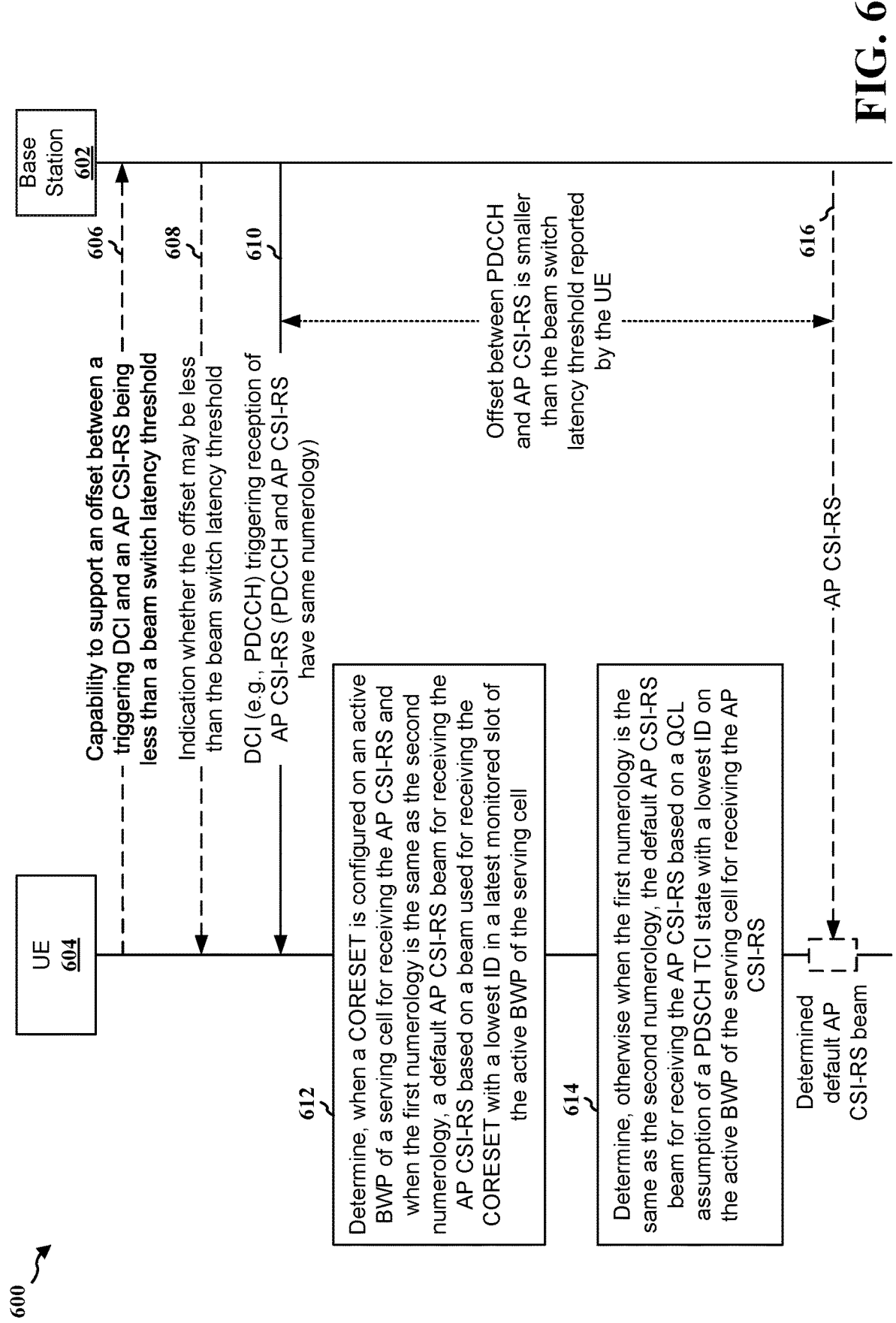
FIG. 6 is a communication flow illustrating an example of a UE determining a default beam for receiving CSI-RS when a triggering PDCCH and the associated CSI-RS have the same numerology according to aspects of the present disclosure.

FIG. 6 is a communication flow 600 illustrating an example of a UE determining a default beam for receiving CSI-RS when a triggering PDCCH and the associated CSI-RS have the same numerology according to aspects of the present disclosure. Optional aspects may be illustrated in dashed line.

At 606, a UE 604 may indicate, to a base station 602, a capability to support a scheduling offset between a triggering DCI (e.g., the last symbol of the PDCCH carrying the triggering DCI) and an AP CSI-RS (e.g., the first symbol of the AP CSI-RS resources) to be less than a beam switch latency threshold (e.g., the beamSwitchTiming threshold) reported by the UE 604 when the triggering PDCCH and the CSI-RS have the same numerology (e.g., same numerology triggering). In one example, the beam switch latency threshold may include at least two values, a first value (e.g., the beamSwitch Timing threshold) may be configured/defined for the same numerology triggering and a second value (e.g., the beamSwitch Timing threshold+d in PDCCH symbols) for the different numerology triggering, such as described above. In another example, at least two separate capabilities may be configured for the UE 604, where the UE 604 may use a first capability to indicate, to the base station 602, a capability to support a scheduling offset between a scheduling DCI and AP CSI-RS to be less than a beam switch latency threshold reported by the UE 604 when the triggering PDCCH and the CSI-RS have different numerologies (e.g., different numerology triggering), and the UE may use a second capability to indicate, to the base station 602, a capability to support a scheduling offset between a scheduling DCI and AP CSI-RS to be less than a beam switch latency threshold reported by the UE 604 when the triggering PDCCH and the CSI-RS have the same numerology (e.g., same numerology triggering).

At 608, the base station 602 may indicate to the UE 604 whether a scheduled offset between a triggering DCI and an AP CSI-RS may be less than a beam switch latency threshold reported by the UE 604 and/or may be equal to or greater than the beam switch latency threshold reported by the UE 604, such as using a flag. For example, if the flag is set by the base station 602, it may indicate that the offset between the scheduling DCI and the AP CSI-RS may be less than the beam switch latency threshold, and if the flag is not set by the base station 602, it may indicate that the offset may be equal to or greater than the beam switch latency threshold, etc. In one example, the base station 602 may be configured with two separate flags for same numerology triggering and different numerology triggering, e.g., one flag for the same numerology triggering and another flag for the different numerology triggering. In another example, the base station may be configured with a single flag for both the same numerology triggering and the different numerology triggering. In another example, the base station 602 may set the flag if the UE 604 has indicated to the base station 602 the capability to support the scheduled offset that is less than the beam switch latency threshold reported by the UE 604 at 606, and the base station 602 may not set the flag if the UE 604 has not indicated to the base station 602 the capability to support a scheduled offset that is less than the beam switch latency threshold reported by the UE. The base station 602 may indicate the flag to the UE 604 in at least one of DCI, a MAC-CE, and/or RRC signaling. As such, if the flag is set by the base station 602, the UE 604 may apply a default CSI-RS beam rule for the same numerology triggering and/or the different numerology triggering to set default AP CSI-RS beam when a base station schedules an offset that is less than the beam switch latency threshold reported by the UE.

At 610, the UE 604 may receive DCI in a PDCCH from the base station 602. The DCI may trigger reception of AP CSI-RS and reporting of CSI, where the PDCCH may be associated with a first numerology and the AP CSI-RS may be associated with a second numerology.

At 612, after receiving the DCI, the UE 604 may determine, when a CORESET is configured on an active BWP of a serving cell for receiving the AP CSI-RS and when the first numerology is the same as the second numerology, a default AP CSI-RS beam for receiving the AP CSI-RS may be used based on a beam used for receiving the CORESET with a lowest ID in a latest monitored slot of the active BWP of the serving cell.

At 614, if a CORESET is not configured on the active BWP of the serving cell for receiving the AP CSI-RS, the UE 604 may determine, when the first numerology is the same as the second numerology, the default AP CSI-RS beam for receiving the AP CSI-RS based on a QCL assumption of a physical PDSCH TCI state with a lowest ID on the active BWP of the serving cell for receiving the AP CSI-RS. At 616, the UE 604 may receive AP CSI-RS from the base station 602 based on the determined default AP CSI-RS beam.

Figure 7:
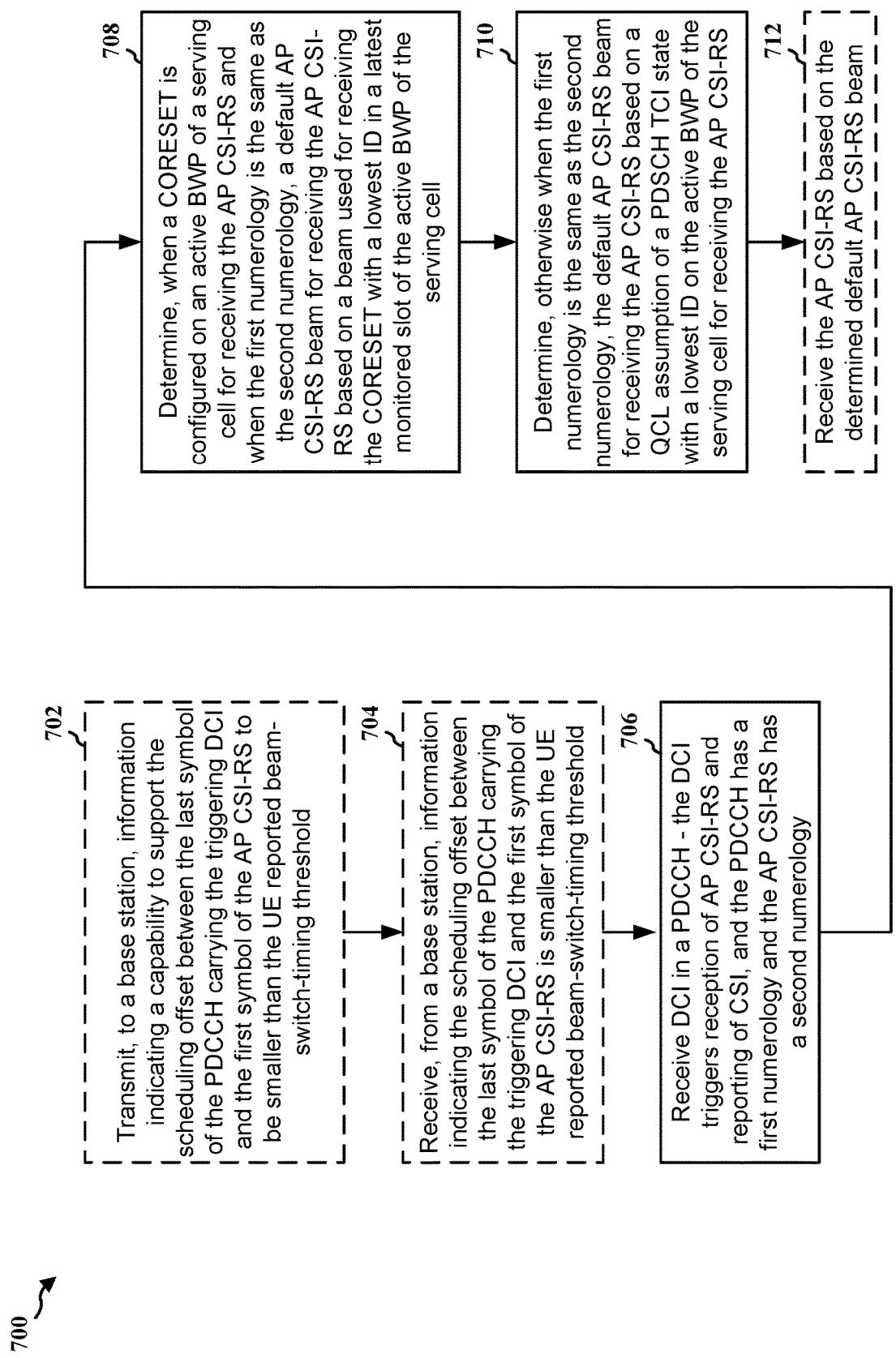
FIG. 7 is a flowchart of a method of wireless communication.

FIG. 7 is a flowchart 700 of a method of wireless communication. The method may be performed by a UE or a component of a UE (e.g., the UE 104, 350, 604; the apparatus 802; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable a UE to determine a default beam for receiving AP CSI-RS if a triggering PDCCH and the associated AP CSI-RS have the same numerology (or same numerology triggering).

At 702, the UE may transmit, to a base station, information indicating a capability to support the scheduling offset between the last symbol of the PDCCH carrying the triggering DCI and the first symbol of the AP CSI-RS to be smaller than the UE reported beam-switch-timing threshold, such as described in connection with FIG. 6. For example, at 606, the UE 604 indication to the base station 602 a capability to support an offset between a triggering DCI and an AP CSI-RS being less than a beam switch latency threshold reported by the UE 604. The transmission of the information indicating the UE's capability may be performed, e.g., by the UE capability indication component 840 and/or the transmission component 834 of the apparatus 802 in FIG. 8.

In one example, the UE may transmit, to the base station, information indicating a separate capability to support the scheduling offset being smaller than the UE reported beam-switch-timing threshold when the first numerology is different from the second numerology, such that there are two separate capabilities for the same numerology triggering and the different numerology triggering.

In another example, the base station may be a single TRP or include a single TRP.

At 704, the UE may receive, from the base station, information indicating the scheduling offset between the last symbol of the PDCCH carrying the triggering DCI and the first symbol of the AP CSI-RS is smaller than the UE reported beam-switch-timing threshold, such as described in connection with FIG. 6. For example, at 608, the UE 604 may receive an indication from the base station 602 indicating whether the scheduling offset between the triggering DCI and the AP CSI-RS is smaller than the beam switch timing threshold reported by the UE. The reception of the indication may be performed, e.g., by the offset indication process component 842 and/or the reception component 830 of the apparatus 802 in FIG. 8. In one example, the UE may receive the information based on transmitting, to the base station, information indicating a capability to support the scheduling offset being smaller than the UE reported beam-switch-timing threshold.

In one example, the information indicating the scheduling offset being smaller than the UE reported beam-switch-timing threshold may be based on a flag set by the base station. For example, the flag being set by the base station may indicate the scheduling offset is smaller than the UE reported beam-switch-timing threshold, and the flag is not being set by the base station may indicate the scheduling offset is greater than or equal to the UE reported beam-switch-timing threshold. In such an example, the flag may be set by the base station via at least one of DCI, a MAC-CE, or RRC signaling.

In another example, the information indicating the scheduling offset being smaller than the UE reported beam-switch-timing threshold may be based on a first flag and a second flag set by the base station, where the first flag may be associated with the first numerology being the same as the second numerology and the second flag may be associated with the first numerology being different from the second numerology. In such an example, the first flag and the second flag may be set by the base station via at least one of DCI, a MAC-CE, or RRC signaling.

At 706, the UE may receive DCI in a PDCCH, the DCI may trigger reception of AP CSI-RS and reporting of CSI, and the PDCCH may have a first numerology and the AP CSI-RS may have a second numerology, such as described in connection with FIG. 6. For example, at 610, the UE 604 may receive DCI in a PDCCH from the base station 602 that triggers the reception of AP CSI-RS. The reception of the DCI may be performed, e.g., by the DCI process component 844 and/or the reception component 830 of the apparatus 802 in FIG. 8.

At 708, the UE may determine, when a CORESET is configured on an active BWP of a serving cell for receiving the AP CSI-RS and when the first numerology is the same as the second numerology, a default AP CSI-RS beam for receiving the AP CSI-RS based on a beam used for receiving the CORESET with a lowest ID in a latest monitored slot of the active BWP of the serving cell. In one example, the scheduling offset between a last symbol of the PDCCH carrying the triggering DCI and a first symbol of the AP CSI-RS may be smaller than a UE reported beam-switch-timing threshold, such as described in connection with FIG. 6. For example, at 612, the UE 604 may determine, when a CORESET is configured on an active BWP of a serving cell for receiving the AP CSI-RS and when the first numerology is the same as the second numerology, a default AP CSI-RS beam for receiving the AP CSI-RS based on a beam used for receiving the CORESET with a lowest ID in a latest monitored slot of the active BWP of the serving cell. The determination of the default AP CSI-RS beam for receiving the AP CSI-RS may be performed, e.g., by the default beam determination component 846 of the apparatus 802 in FIG. 8.

At 710, the UE may determine, otherwise when the first numerology is the same as the second numerology, the default AP CSI-RS beam for receiving the AP CSI-RS based on a QCL assumption of a PDSCH TCI state with a lowest ID on the active BWP of the serving cell for receiving the AP CSI-RS, such as described in connection with FIG. 6. For example, at 614, the UE 604 may determine, otherwise when the first numerology is the same as the second numerology, the default AP CSI-RS beam for receiving the AP CSI-RS based on a QCL assumption of a PDSCH TCI state with a lowest ID on the active BWP of the serving cell for receiving the AP CSI-RS. The determination of the default AP CSI-RS beam for receiving the AP CSI-RS may be performed, e.g., by the default beam determination component 846 of the apparatus 802 in FIG. 8.

At 712, the UE may receive the AP CSI-RS based on the determined default AP CSI-RS beam, such as described in connection with FIG. 6. For example, at 616, the UE 604 may receive AP CSI-RS from the base station 602 based on the determined default AP CSI-RS beam. The reception of the CSI-RS may be performed, e.g., by the CSI-RS process component 848 and/or the reception component 830 of the apparatus 802 in FIG. 8.

Figure 8:
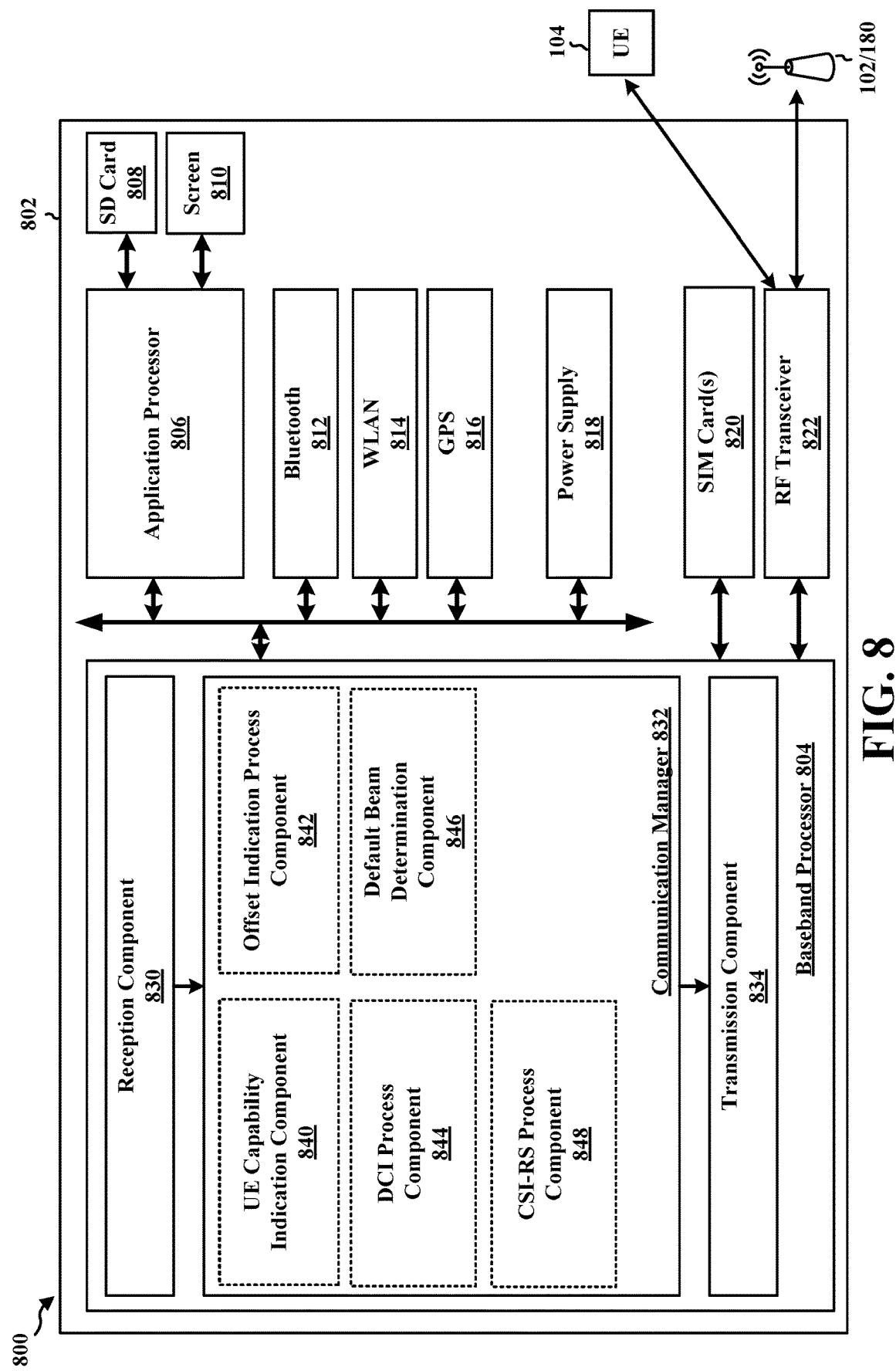
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/ memory. The computer-readable medium/memory may be non-transitory. The cellular baseband processor 804 is responsible for general processing, including the execution of software stored on the computer-readable medium/ memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 includes a UE capability indication component 840 that is configured to transmit, to a base station, information indicating a capability to support the scheduling offset between the last symbol of the PDCCH carrying the triggering DCI and the first symbol of the AP CSI-RS to be smaller than the UE reported beam-switch-timing threshold, e.g., as described in connection with 702 of FIG. 7. The communication manager 832 further includes an offset indication process component 842 that is configured to receive, from the base station, information indicating the scheduling offset between the last symbol of the PDCCH carrying the triggering DCI and the first symbol of the AP CSI-RS is smaller than the UE reported beam-switch-timing threshold, e.g., as described in connection with 704 of FIG. 7. The communication manager 832 further includes a DCI process component 844 that is configured to receive DCI in a PDCCH, the DCI may trigger reception of AP CSI-RS and reporting of CSI, and the PDCCH may have a first numerology and the AP CSI-RS may have a second numerology, e.g., as described in connection with 706 of FIG. 7. The communication manager 832 further includes a default beam determination component 846 that is configured to determine, when a CORESET is configured on an active BWP of a serving cell for receiving the AP CSI-RS and when the first numerology is the same as the second numerology, a default AP CSI-RS beam for receiving the AP CSI-RS based on a beam used for receiving the CORESET with a lowest ID in a latest monitored slot of the active BWP of the serving cell, and determine, otherwise when the first numerology is the same as the second numerology, the default AP CSI-RS beam for receiving the AP CSI-RS based on a QCL assumption of a PDSCH TCI state with a lowest ID on the active BWP of the serving cell for receiving the AP CSI-RS, e.g., as described in connection with 708 and 710 of FIG. 7. The communication manager 832 further includes a CSI-RS process component 848 that is configured to receive the AP CSI-RS based on the determined default AP CSI-RS beam, e.g., as described in connection with 712 of FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for transmitting, to a base station, information indicating a capability to support the scheduling offset between the last symbol of the PDCCH carrying the triggering DCI and the first symbol of the AP CSI-RS to be smaller than the UE reported beam-switch-timing threshold (e.g., the UE capability indication component 840 and/or the transmission component 834). The apparatus 802 includes means for receiving, from the base station, information indicating the scheduling offset between the last symbol of the PDCCH carrying the triggering DCI and the first symbol of the AP CSI-RS is smaller than the UE reported beam-switch-timing threshold (e.g., the offset indication process component 842 and/or the reception component 830). The apparatus 802 includes means for receiving DCI in a PDCCH, the DCI triggering reception of AP CSI-RS and reporting of CSI, the PDCCH having a first numerology and the AP CSI-RS having a second numerology (e.g., the DCI process component 844 and/or the reception component 830). The apparatus 802 includes means for determining, when a CORESET is configured on an active BWP of a serving cell for receiving the AP CSI-RS and when the first numerology is the same as the second numerology, a default AP CSI-RS beam for receiving the AP CSI-RS based on a beam used for receiving the CORESET with a lowest ID in a latest monitored slot of the active BWP of the serving cell (e.g., the default beam determination component 846). The apparatus 802 includes means for determining, otherwise when the first numerology is the same as the second numerology, the default AP CSI-RS beam for receiving the AP CSI-RS based on a QCL assumption of a PDSCH TCI state with a lowest ID on the active BWP of the serving cell for receiving the AP CSI-RS (e.g., the default beam determination component 846). The apparatus 802 includes means for receive the AP CSI-RS based on the determined default AP CSI-RS beam (e.g., the CSI-RS process component 848 and/or the reception component 830).

In one configuration, a scheduling offset between a last symbol of the PDCCH carrying the triggering DCI and a first symbol of the AP CSI-RS is smaller than a UE reported beam-switch-timing threshold.

In another configuration, the UE may transmit, to the base station, information indicating a separate capability to support the scheduling offset being smaller than the UE reported beam-switch-timing threshold when the first numerology is different from the second numerology, such that there are two separate capabilities for the same numerology triggering and the different numerology triggering.

In another configuration, the base station may be a single TRP, or includes a single TRP.

In another configuration, the UE may receive the information based on transmitting, to the base station, information indicating a capability to support the scheduling offset being smaller than the UE reported beam-switch-timing threshold.

In another configuration, the information indicating the scheduling offset being smaller than the UE reported beam-switch-timing threshold may be based on a flag set by the base station. In such a configuration, if the flag is set by the base station, it may indicate that the scheduling offset is smaller than the UE reported beam-switch-timing threshold, and if the flag is not set by the base station, it may indicate the scheduling offset is equal to or greater than the UE reported beam-switch-timing threshold. In such a configuration, the flag may be set by the base station via at least one of DCI, a MAC-CE, or RRC signaling.

In another configuration, the information indicating the scheduling offset being smaller than the UE reported beam-switch-timing threshold may be based on a first flag and a second flag set by the base station, where the first flag may be associated with the first numerology being the same as the second numerology and the second flag may be associated with the first numerology being different from the second numerology. In such a configuration, the first flag and the second flag may be set by the base station via at least one of DCI, a MAC-CE, or RRC signaling.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
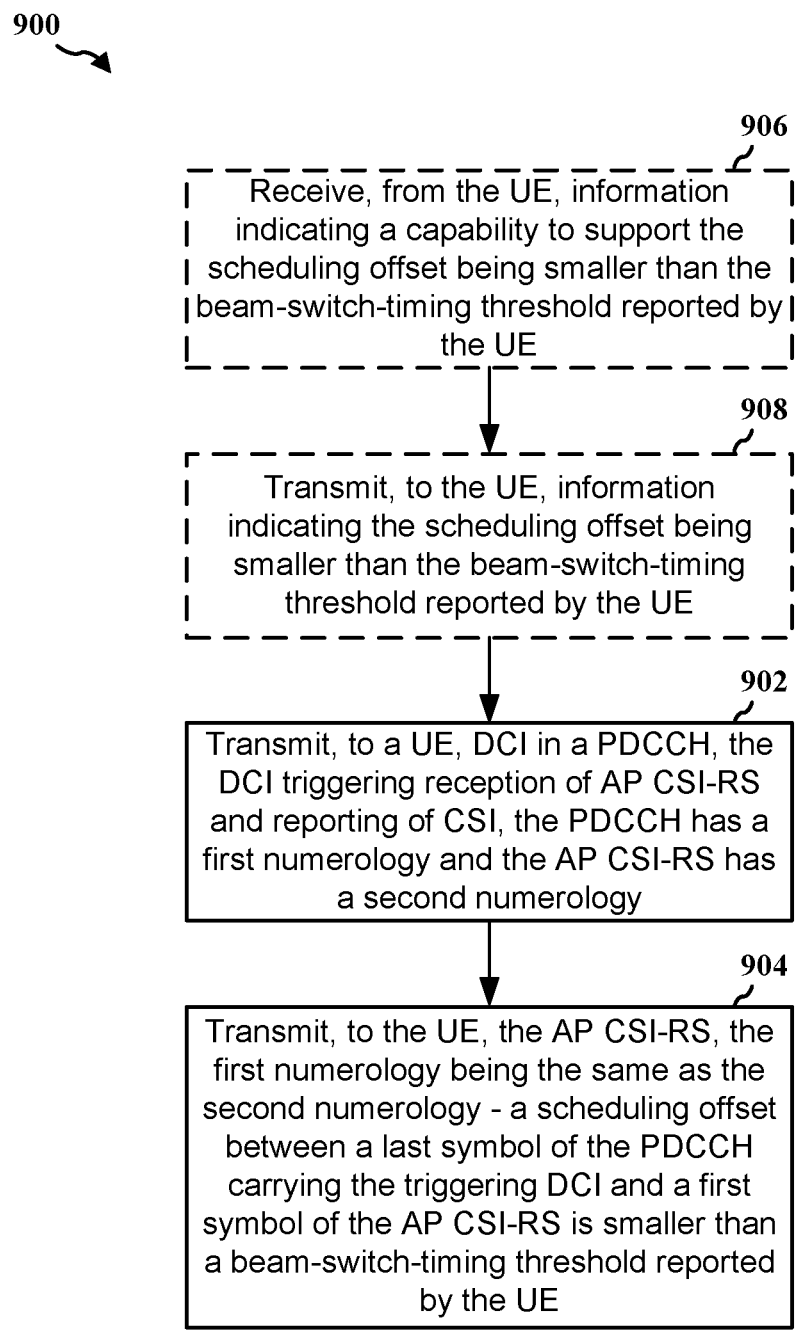
FIG. 9 is a flowchart of a method of wireless communication.

FIG. 9 is a flowchart 900 of a method of wireless communication. The method may be performed by a base station or a component of a base station (e.g., the base station 102, 180, 310, 602; the apparatus 1002; a processing system, which may include the memory 376 and which may be the entire base station 310 or a component of the base station 310, such as the TX processor 316 the RX processor 370, and/or the controller/processor 375). Optional aspects are illustrated with a dashed line. The method may enable the base station to transmit DCI and AP CSI-RS triggered by the DCI to a UE with a scheduling offset between the DCI and the AP CSI-RS being less than a beam switch latency threshold reported by the UE, where the PDCCH carrying the DCI may have the same numerology as the AP CSI-RS.

At 902, the base station may transmit, to a UE, DCI in a PDCCH, the DCI triggering reception of AP CSI-RS and reporting of CSI, the PDCCH has a first numerology and the AP CSI-RS has a second numerology, such as described in connection with FIG. 6. For example, at 610, the base station 602 may transmit DCI to the UE 604, where the DCI triggers the reception of AP CSI-RS at the UE 604, and the PDCCH carrying the DCI is associated with a numerology that is different from the numerology associated with the AP CSI-RS. The transmission of the DCI may be performed, e.g., by the DCI configuration component 1040 and/or the transmission component 1034 of the apparatus 1002 in FIG. 10.

At 904, the base station may transmit, to the UE, the AP CSI-RS, the first numerology being the same as the second numerology, where a scheduling offset between a last symbol of the PDCCH carrying the triggering DCI and a first symbol of the AP CSI-RS is smaller than a beam-switch-timing threshold reported by the UE, such as described in connection with FIG. 6. For example, at 616, the base station 602 may transmit the AP CSI-RS to the UE 604 based on the transmitted DCI, and the scheduling offset between the PDCCH carrying the triggering DCI and the AP CSI-RS may be smaller than the beam-switch-timing threshold reported by the UE. The transmission of the AP CSI-RS may be performed, e.g., by the AP CSI-RS configuration component 1042 and/or the transmission component 1034 of the apparatus 1002 in FIG. 10.

In one example, as shown at 906, the base station may receive, from the UE, information indicating a capability to support the scheduling offset being smaller than the beam-switch-timing threshold reported by the UE. In such an example, the base station may receive, from the UE, information indicating a separate capability to support a scheduling offset being smaller than the UE reported beam-switch-timing threshold when the first numerology is different from the second numerology.

In another example, at shown at 908, the base station may transmit, to the UE, information indicating the scheduling offset being smaller than the beam-switch-timing threshold reported by the UE. In such an example, the base station may transmit the information indicating the scheduling offset being smaller than the beam-switch-timing threshold based on the capability indicated by the UE. In such an example, the information may be transmitted via at least one of DCI, a MAC-CE, or RRC signaling.

Figure 10:
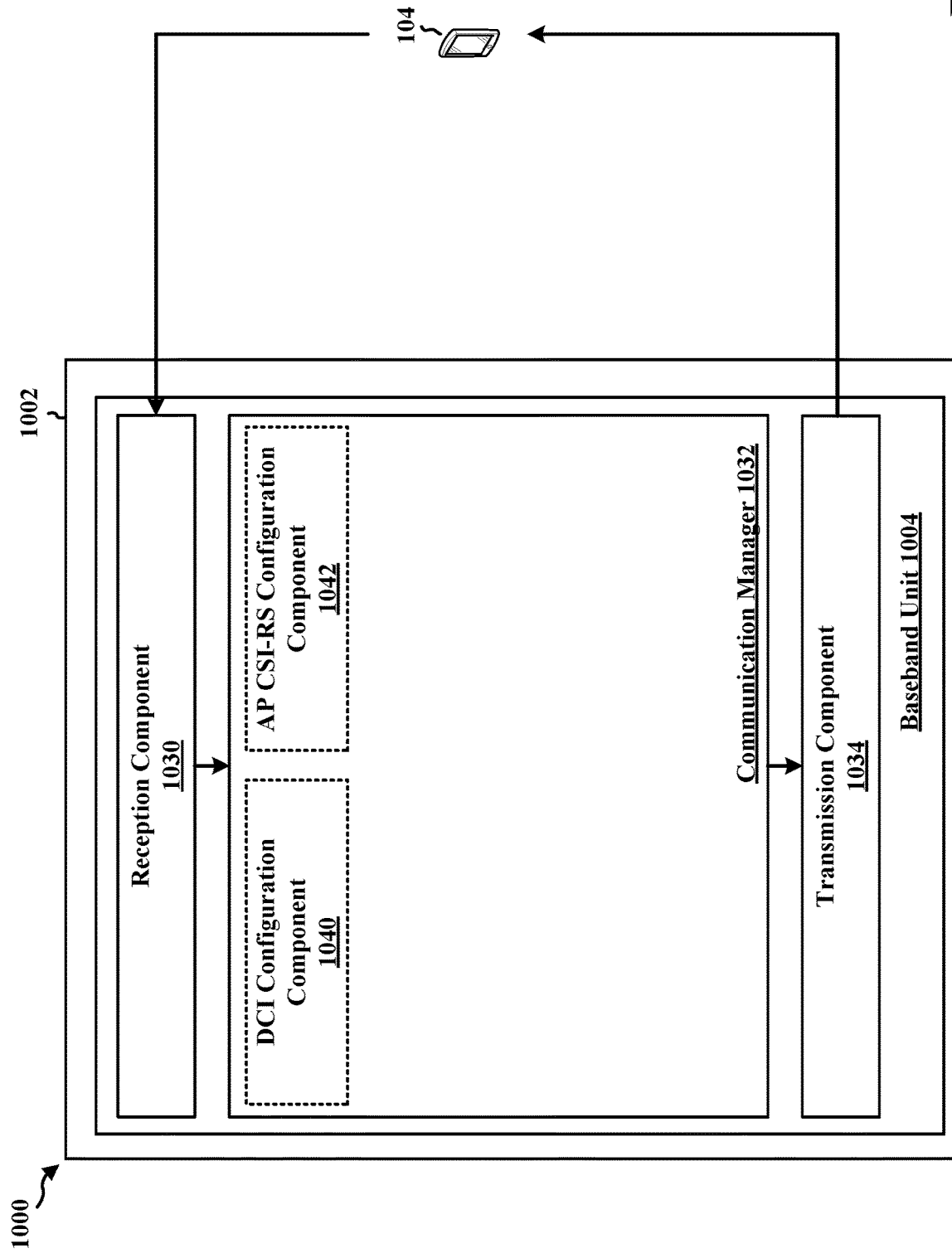
FIG. 10 is a diagram illustrating an example of a hardware implementation for an example apparatus.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a DCI configuration component 1040 that is configured to transmit, to a UE, DCI in a PDCCH, the DCI triggering reception of AP CSI-RS and reporting of CSI, the PDCCH has a first numerology and the AP CSI-RS has a second numerology, e.g., as described in connection with 902 of FIG. 9. The communication manager 1032 further includes an AP CSI-RS configuration component 1042 that is configured to transmit, to the UE, the AP CSI-RS, the first numerology being the same as the second numerology, where a scheduling offset between a last symbol of the PDCCH carrying the triggering DCI and a first symbol of the AP CSI-RS is smaller than a beam-switch-timing threshold reported by the UE, e.g., as described in connection with 904 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for transmitting, to a UE, DCI in a PDCCH, the DCI triggering reception of AP CSI-RS and reporting of CSI, the PDCCH has a first numerology and the AP CSI-RS has a second numerology (e.g., the DCI configuration component 1040 and/or the transmission component 1034). The apparatus 1002 includes means for transmitting, to the UE, the AP CSI-RS, the first numerology being the same as the second numerology, where a scheduling offset between a last symbol of the PDCCH carrying the triggering DCI and a first symbol of the AP CSI-RS is smaller than a beam-switch-timing threshold reported by the UE (e.g., the AP CSI-RS configuration component 1042 and/or the transmission component 1034).

In another configuration, the base station may receive, from the UE, information indicating a capability to support the scheduling offset being smaller than the beam-switch-timing threshold reported by the UE. In such a configuration, the base station may receive, from the UE, information indicating a separate capability to support a scheduling offset being smaller than the UE reported beam-switch-timing threshold when the first numerology is different from the second numerology.

In another configuration, the base station may transmit, to the UE, information indicating the scheduling offset being smaller than the beam-switch-timing threshold reported by the UE. In such a configuration, the base station may transmit the information indicating the scheduling offset being smaller than the beam-switch-timing threshold based on the capability indicated by the UE. In such a configuration, the information may be transmitted via at least one of DCI, a MAC-CE, or RRC signaling.

The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following aspects are illustrative only and may be combined with other aspects or teachings described herein, without limitation.

Aspect 1 is a method of wireless communication of a UE, comprising: receiving DCI in a PDCCH, the DCI triggering reception of AP CSI-RS and reporting of CSI, the PDCCH having a first numerology and the AP CSI-RS having a second numerology; determining, when a CORESET is configured on an active BWP of a serving cell for receiving the AP CSI-RS and when the first numerology is the same as the second numerology, a default AP CSI-RS beam for receiving the AP CSI-RS based on a beam used for receiving the CORESET with a lowest ID in a latest monitored slot of the active BWP of the serving cell; and determining, otherwise when the first numerology is the same as the second numerology, the default AP CSI-RS beam for receiving the AP CSI-RS based on a QCL assumption of a PDSCH TCI state with a lowest ID on the active BWP of the serving cell for receiving the AP CSI-RS.

In aspect 2, the method of aspect 1 further includes that a scheduling offset between a last symbol of the PDCCH carrying the triggering DCI and a first symbol of the AP CSI-RS is smaller than a UE reported beam-switch-timing threshold.

In aspect 3, the method of aspect 1 or aspect 2 further comprises: transmitting, to a base station, information indicating a capability to support the scheduling offset being smaller than the UE reported beam-switch-timing threshold.

In aspect 4, the method of any of aspects 1-3 further comprises: transmitting, to the base station, information indicating a separate capability to support a scheduling offset being smaller than the UE reported beam-switch-timing threshold when the first numerology is different from the second numerology.

In aspect 5, the method of any of aspects 1-4 further includes that the base station includes a single TRP.

In aspect 6, the method of any of aspects 1-5 further comprises: receiving, from abase station, information indicating the scheduling offset being smaller than the UE reported beam-switch-timing threshold.

In aspect 7, the method of any of aspects 1-6 further includes that the UE receives the information based on transmitting, to the base station, information indicating a capability to support the scheduling offset being smaller than the UE reported beam-switch-timing threshold.

In aspect 8, the method of any of aspects 1-7 further includes that the information indicating the scheduling offset being smaller than the UE reported beam-switch-timing threshold is based on a flag set by the base station.

In aspect 9, the method of any of aspects 1-8 further includes that the flag being set by the base station indicates the scheduling offset is smaller than the UE reported beam-switch-timing threshold, and the flag is not being set by the base station indicates the scheduling offset is greater than or equal to the UE reported beam-switch-timing threshold.

In aspect 10, the method of any of aspects 1-9 further includes that the flag is set by the base station via at least one of DCI, a MAC-CE, or RRC signaling.

In aspect 11, the method of any of aspects 1-10 further includes that the information indicating the scheduling offset being smaller than the UE reported beam-switch-timing threshold is based on a first flag and a second flag set by the base station, where the first flag is associated with the first numerology being the same as the second numerology and the second flag is associated with the first numerology being different from the second numerology.

In aspect 12, the method of any of aspects 1-11 further includes that the first flag and the second flag are set by the base station via at least one of DCI, a MAC-CE, or RRC signaling.

Aspect 13 is an apparatus for wireless communication including at least one processor coupled to a memory and configured to implement a method as in any of aspects 1 to 12.

Aspect 14 is an apparatus for wireless communication including means for implementing a method as in any of aspects 1 to 12.

Aspect 15 is a computer-readable medium storing computer executable code, where the code when executed by a processor causes the processor to implement a method as in any of aspects 1 to 12.

Aspect 16 is a method of wireless communication at a base station, comprising: transmitting, to a UE, DCI in a PDCCH, the DCI triggering reception of AP CSI-RS and reporting of CSI, the PDCCH having a first numerology and the AP CSI-RS having a second numerology; and transmitting, to the UE, the AP CSI-RS, the first numerology being the same as the second numerology, where a scheduling offset between a last symbol of the PDCCH carrying the triggering DCI and a first symbol of the AP CSI-RS is smaller than a beam-switch-timing threshold reported by the UE.

In aspect 17, the method of aspect 15 further comprises: receiving, from the UE, information indicating a capability to support the scheduling offset being smaller than the beam-switch-timing threshold reported by the UE.

In aspect 18, the method of aspect 16 or aspect 17 further comprises: receiving, from the UE, information indicating a separate capability to support a scheduling offset being smaller than the UE reported beam-switch-timing threshold when the first numerology is different from the second numerology.

In aspect 19, the method of any of aspects 1-18 further comprises transmitting, to the UE, information indicating the scheduling offset being smaller than the beam-switch-timing threshold reported by the UE.

In aspect 20, the method of any of aspects 1-19 further includes that the information is transmitted via at least one of DCI, a MAC-CE, or RRC signaling.

Aspect 21 is an apparatus for wireless communication including at least one processor coupled to a memory and configured to implement a method as in any of aspects 16 to 20.

Aspect 22 is an apparatus for wireless communication including means for implementing a method as in any of aspects 16 to 20.

Aspect 23 is a computer-readable medium storing computer executable code, where the code when executed by a processor causes the processor to implement a method as in any of aspects 16 to 20.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:
   a memory; and
   at least one processor coupled to the memory and configured to:
   receive downlink control information (DCI) in a physical downlink control channel (PDCCH), the DCI triggering reception of aperiodic (AP) channel state information (CSI) reference signal (RS) (CSI-RS) and reporting of CSI, the PDCCH having a first numerology and the AP CSI-RS having a second numerology;
   determine, when a control resource set (CORESET) is configured on an active bandwidth part (BWP) of a serving cell for receiving the AP CSI-RS and when the first numerology is the same as the second numerology, a default AP CSI-RS beam for receiving the AP CSI-RS based on a beam used for receiving the CORESET with a lowest identifier (ID) in a latest monitored slot of the active BWP of the serving cell; and
   determine, otherwise when the first numerology is the same as the second numerology, the default AP CSI-RS beam for receiving the AP CSI-RS based on a quasi-co-located (QCL) assumption of a physical downlink shared channel (PDSCH) transmission control indicator (TCI) state with a lowest ID on the active BWP of the serving cell for receiving the AP CSI-RS.

2. The apparatus of claim 1, wherein a scheduling offset between a last symbol of the PDCCH carrying the triggering DCI and a first symbol of the AP CSI-RS is smaller than a UE reported beam-switch-timing threshold.

3. The apparatus of claim 2, wherein the at least one processor is further configured to:
transmit, to a base station, information indicating a capability to support the scheduling offset being smaller than the UE reported beam-switch-timing threshold.

4. The apparatus of claim 3, wherein the at least one processor is further configured to:
transmit, to the base station, information indicating a separate capability to support a scheduling offset being smaller than the UE reported beam-switch-timing threshold when the first numerology is different from the second numerology.

5. The apparatus of claim 4, wherein the base station includes a single transmission reception point (TRP).

6. The apparatus of claim 2, wherein the at least one processor is further configured to:
receive, from a base station, information indicating the scheduling offset being smaller than the UE reported beam-switch-timing threshold.

7. The apparatus of claim 6, wherein the UE receives the information based on transmitting, to the base station, information indicating a capability to support the scheduling offset being smaller than the UE reported beam-switch-timing threshold.

8. The apparatus of claim 6, wherein the information indicating the scheduling offset being smaller than the UE reported beam-switch-timing threshold is based on a flag set by the base station.

9. The apparatus of claim 8, wherein the flag being set by the base station indicates the scheduling offset is smaller than the UE reported beam-switch-timing threshold, and the flag is not being set by the base station indicates the scheduling offset is greater than or equal to the UE reported beam-switch-timing threshold.

10. The apparatus of claim 8, wherein the flag is set by the base station via at least one of downlink control information (DCI), a medium access control (MAC) control element (CE) (MAC-CE), or radio resource control (RRC) signaling.

11. The apparatus of claim 6, wherein the information indicating the scheduling offset being smaller than the UE reported beam-switch-timing threshold is based on a first flag and a second flag set by the base station, wherein the first flag is associated with the first numerology being the same as the second numerology and the second flag is associated with the first numerology being different from the second numerology.

12. The apparatus of claim 11, wherein the first flag and the second flag are set by the base station via at least one of downlink control information (DCI), a medium access control (MAC) control element (CE) (MAC-CE), or radio resource control (RRC) signaling.

13. A method of wireless communication at a user equipment (UE), comprising:
receiving downlink control information (DCI) in a physical downlink control channel (PDCCH), the DCI triggering reception of aperiodic (AP) channel state information (CSI) reference signal (RS) (CSI-RS) and reporting of CSI, the PDCCH having a first numerology and the AP CSI-RS having a second numerology;

determining, when a control resource set (CORESET) is configured on an active bandwidth part (BWP) of a serving cell for receiving the AP CSI-RS and when the first numerology is the same as the second numerology, a default AP CSI-RS beam for receiving the AP CSI-RS based on a beam used for receiving the CORESET with a lowest identifier (ID) in a latest monitored slot of the active BWP of the serving cell; and determining, otherwise when the first numerology is the same as the second numerology, the default AP CSI-RS beam for receiving the AP CSI-RS based on a quasi-co-located (QCL) assumption of a physical downlink shared channel (PDSCH) transmission control indicator (TCI) state with a lowest ID on the active BWP of the serving cell for receiving the AP CSI-RS.

14. The method of claim 13, wherein a scheduling offset between a last symbol of the PDCCH carrying the triggering DCI and a first symbol of the AP CSI-RS is smaller than a UE reported beam-switch-timing threshold.

15. The method of claim 14, further comprising:
transmitting, to a base station, information indicating a capability to support the scheduling offset being smaller than the UE reported beam-switch-timing threshold.

16. The method of claim 15, further comprising:
transmitting, to the base station, information indicating a separate capability to support a scheduling offset being smaller than the UE reported beam-switch-timing threshold when the first numerology is different from the second numerology.

17. The method of claim 16, wherein the base station includes a single transmission reception point (TRP).

18. The method of claim 14, further comprising:
receiving, from a base station, information indicating the scheduling offset being smaller than the UE reported beam-switch-timing threshold.

19. The method of claim 18, wherein the UE receives the information based on transmitting, to the base station, information indicating a capability to support the scheduling offset being smaller than the UE reported beam-switch-timing threshold.

20. The method of claim 18, wherein the information indicating the scheduling offset being smaller than the UE reported beam-switch-timing threshold is based on a flag set by the base station.

21. The method of claim 20, wherein the flag being set by the base station indicates the scheduling offset is smaller than the UE reported beam-switch-timing threshold, and the flag not being set by the base station indicates the scheduling offset is greater than or equal to the UE reported beam-switch-timing threshold.

22. The method of claim 21, wherein the flag is set by the base station via at least one of downlink control information (DCI), a medium access control (MAC) control element (CE) (MAC-CE), or radio resource control (RRC) signaling.

23. The method of claim 18, wherein the information indicating the scheduling offset being smaller than the UE reported beam-switch-timing threshold is based on a first flag and a second flag set by the base station, wherein the first flag is associated with the first numerology being the same as the second numerology and the second flag is associated with the first numerology being different from the second numerology.

24. The method of claim 23, wherein the first flag and the second flag are set by the base station via at least one of downlink control information (DCI), a medium access control (MAC) control element (CE) (MAC-CE), or radio resource control (RRC) signaling.

25. An apparatus for wireless communication at a base station, comprising:
- a memory; and
- at least one processor coupled to the memory and configured to:
  - transmit, to a user equipment (UE), downlink control information (DCI) in a physical downlink control channel (PDCCH), the DCI triggering reception of aperiodic (AP) channel state information (CSI) reference signal (RS) (CSI-RS) and reporting of CSI, the PDCCH having a first numerology and the AP CSI-RS having a second numerology; and
  - transmit, to the UE, the AP CSI-RS, the first numerology being the same as the second numerology, wherein a scheduling offset between a last symbol of the PDCCH carrying the triggering DCI and a first symbol of the AP CSI-RS is smaller than a beam-switch-timing threshold reported by the UE.

26. The apparatus of claim 25, wherein the at least one processor is further configured to:
- receive, from the UE, information indicating a capability to support the scheduling offset being smaller than the beam-switch-timing threshold reported by the UE.

27. The apparatus of claim 26, wherein the at least one processor is further configured to:
- receive, from the UE, information indicating a separate capability to support a scheduling offset being smaller than the UE reported beam-switch-timing threshold when the first numerology is different from the second numerology.

28. The apparatus of claim 25, wherein the at least one processor is further configured to:
- transmit, to the UE, information indicating the scheduling offset being smaller than the beam-switch-timing threshold reported by the UE.

29. The apparatus of claim 28, wherein the information is transmitted via at least one of downlink control information (DCI), a medium access control (MAC) control element (CE) (MAC-CE), or radio resource control (RRC) signaling.

30. A method of wireless communication at a base station, comprising:
- transmitting, to a user equipment (UE), downlink control information (DCI) in a physical downlink control channel (PDCCH), the DCI triggering reception of aperiodic (AP) channel state information (CSI) reference signal (RS) (CSI-RS) and reporting of CSI, the PDCCH having a first numerology and the AP CSI-RS having a second numerology; and
- transmitting, to the UE, the AP CSI-RS, the first numerology being the same as the second numerology, wherein a scheduling offset between a last symbol of the PDCCH carrying the triggering DCI and a first symbol of the AP CSI-RS is smaller than a beam-switch-timing threshold reported by the UE.

* * * * *